Figure 4:
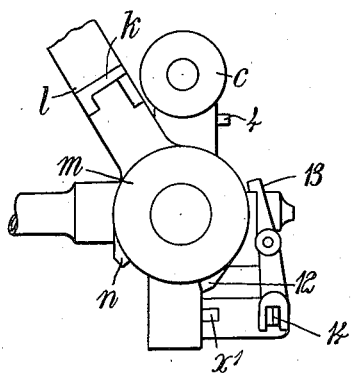

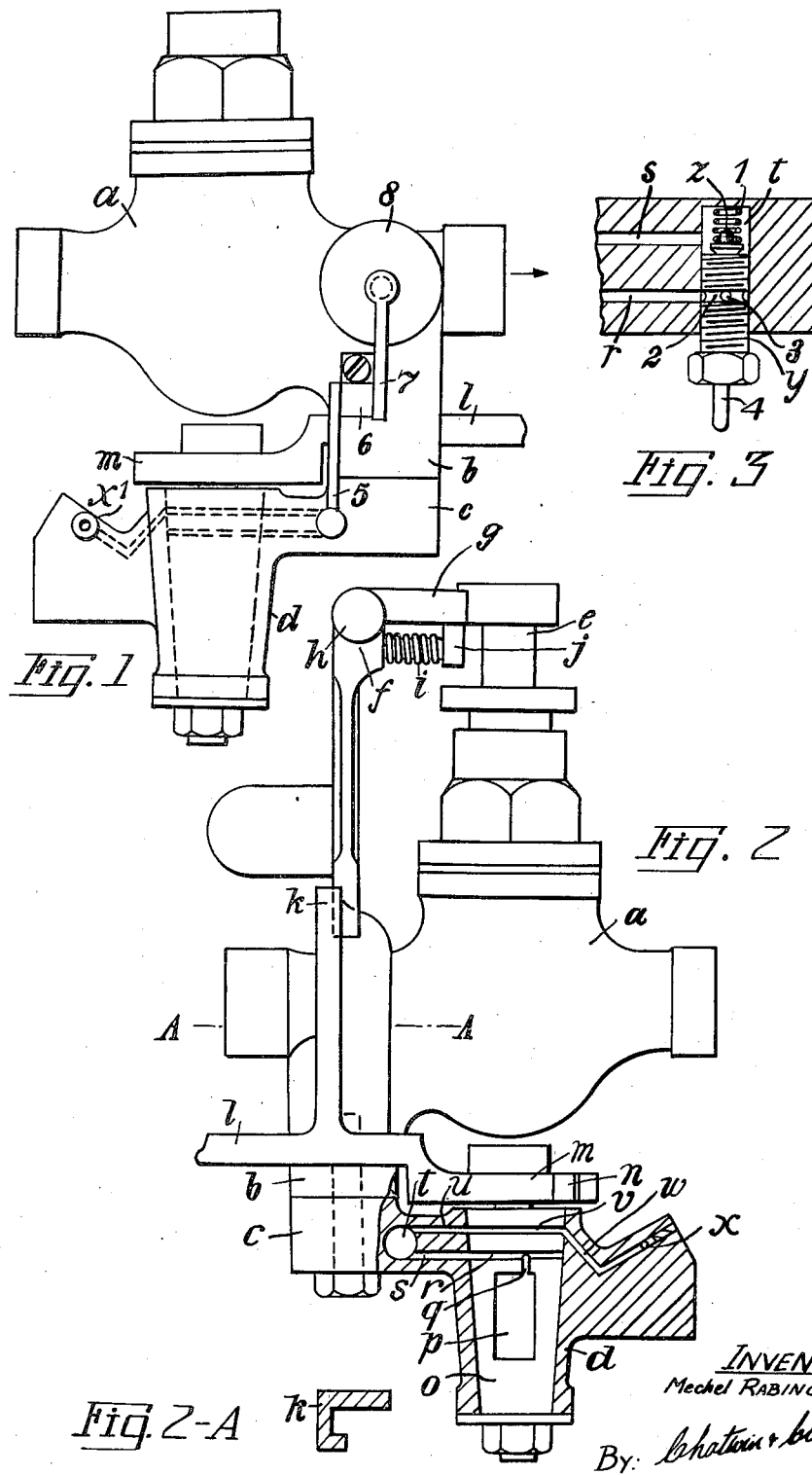

June 17, 1941.  M. RABINOWICZ  2,245,822
GAS SUPPLY CONTROL MEANS FOR WATER HEATERS
Filed May 2, 1939  2 Sheets-Sheet 2

Inventor,
M. Rabinowicz
By: Glascock Downing & Seibold
Atty.

Patented June 17, 1941

2,245,822

UNITED STATES PATENT OFFICE 2,245,822

GAS SUPPLY CONTROL MEANS FOR WATER HEATERS

Mechel Rabinowicz, London, England

Application May 2, 1939, Serial No. 271,362
In Great Britain May 7, 1938

11 Claims. (Cl. 236—25)

This invention relates to means for controlling the supply of gas to burners for water heating appliances, such as water heaters, geysers, boilers and the like.

The present invention has for its object to provide improved means for ensuring that the gas supply is turned off in the event of the water supply failing, for instance owing to the water being cut off at the main.

It has been proposed to provide means for regulating the gas supply to geysers and the like in dependence on the water supply, comprising diaphragms which are acted on by the water pressure or by the suction produced by the flow of the water through a pipe, the said diaphragms being connected up to the main gas control valve so as to maintain it in the open position as long as water is being supplied to the geyser, the main gas tap being closed automatically in the event of the pressure of the water or the flow failing.

In accordance with the present invention, the main gas valve or tap is provided with means for automatically closing it, the said means being under the control of a thermostat which is heated by one or more flames which remain alight, at least the whole of the time the main gas burner or burners is or are required to be in operation, the said flame or flames being supplied with gas under the control of a valve operated in dependence on the water supply, in such a manner that in the event of the water supply failing the gas supply to the said flame or flames is cut off and the supply of heat to the thermostat ceases, whereby the automatic closing means comes into action and shuts off the gas supply to the main burner or burners. The said flame or flames, preferably serve for relighting the main burner in the event of the latter being extinguished accidentally, the gas supply to the main burner being shut off in the event of the said flame or flames becoming extinguished or the water supply failing. By means of this arrangement, the means for controlling the gas supply in dependence on the water supply can be made very light and compact, since only a comparatively small flame is necessary to maintain the thermostat in operation and the control valve need therefore only be of comparatively small size.

In carrying out the invention, in one embodiment, the gas supply to the pilot flame is controlled by means of a piston housed in a small casing which is screwed into the water supply pipe, one side of the piston being subjected to the pressure of the water in the supply pipe and the other side being provided with a stem which projects out of the casing and actuates the gas valve for the pilot burner, either directly or through the intermediary of a lever. In order to avoid the difficulties attending the provision of sealing means for the stem of the piston which will effectively prevent leakage of water and at the same time allow sufficient freedom of movement, it is preferable to employ a diaphragm instead of a piston, the said diaphragm being clamped around its edge inside the casing and effectively preventing any leakage while at the same time being very sensitive.

In the case of controlling devices in the form of a piston or diaphragm which is acted on by the pressure of the water, it is necessary to provide the controlling device on the downstream side of the tap which controls the water supply to the water heating apparatus. This necessity does not arise in the case of controlling devices which operate in dependence on the flow of water and in cases where the additional complication and expense is not of primary importance, the casing may communicate with a pipe or chamber in which a partial vacuum is produced by the water flow, for instance by means of an ejector device fitted in the water pipe. The ejector device may be in the form of a Venturi tube the throat of which is in communication with a casing containing a diaphragm, the arrangement being such that the suction set up by the flow of water through the pipe displaces the diaphragm and moves the pilot flame control valve into the open position.

Instead of the stem of the piston or diaphragm protruding from the casing, it may be housed wholly within it, the gas valve being housed in the interior of the casing on the side of the diaphragm remote from the water pipe or suction pipe or chamber and being acted on by the stem of the diaphragm, so as to control the flow of gas through the said casing, the gas valve being arranged to open and close an inlet or outlet opening for the gas in the casing.

Figure 5:
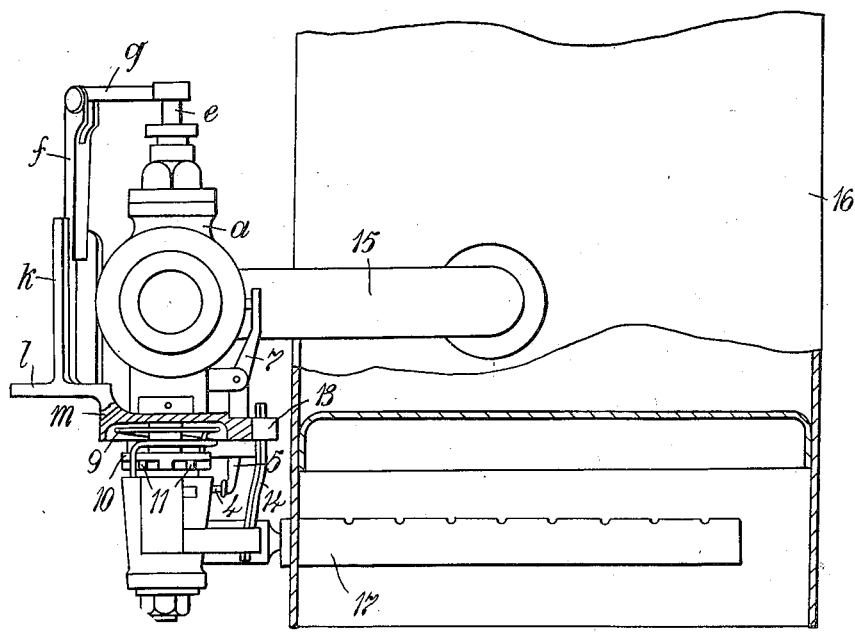

A constructional example of gas supply controlling means according to the invention is illustrated by way of example in the accompanying drawings, in which Fig. 1 is an elevation of one side of a unit comprising a gas and a water tap, Fig. 2 is an elevation of the other side of the unit, the gas tap being shown in vertical section, Figs. 2A and 3 are horizontal sections of details, Fig. 4 is a plan view of the gas tap shown in Figs. 1 and 2 showing the thermostat and locking member for retaining the tap in the open position and Fig. 5 shows a water heater with gas and water supply controlling means in accordance with the invention, the boss of the actuating handle being in section to show the closing spring for the gas top.

Referring to the drawings, the water tap $a$ is provided with a downwardly extending boss $b$ to which is screwed an arm $c$ extending laterally from the upper end of the gas tap $d$, the arrangement being such that the plug $o$ of the gas tap is substantially co-axial with the stem $e$ of the water tap. The water tap is actuated by means of a bar $f$ which is pivoted at $h$ to a crank arm $g$ secured to the stem $e$ of the water tap, the said bar extending downwardly and its lower end engaging behind an upright projection $k$ on a handle $l$ secured to the gas tap, the arrangement being such that on the water tap being opened the handle $l$ is turned simultaneously to open the gas tap. The bar $f$ is pressed outwardly to engage behind the projection $k$ by means of a spring $i$ one end of which projects against an abutment $j$ on the crank arm $g$, the arrangement being such that the bar $f$ can be rocked out of engagement with the projection $k$ so as to enable the water tap to be opened without opening the gas tap for supplying cold water when required. The length of the bar $f$ is such that it allows the water tap to be turned farther after reaching the normal closed position so that in the event of the washer of the water tap becoming worn, the tap can be turned farther so as to shut off the water supply completely. It is also preferable to arrange the handle $l$ in such a manner that a space is left between it and the boss $b$ in the fully closed position of the gas tap so as to allow for a certain amount of take-up necessary owing to wear of the washer of the water tap.

The plug $o$ of the gas tap is provided with an opening $p$ for supplying gas to the main burner 17, the said opening being in the form of a large slot so as to allow the full supply of gas to be admitted when the water tap is only in the partly opened position so as to enable hot water to be supplied, the arrangement being such that a larger supply of cooler water can be obtained simply by turning the water tap farther into the full open position. The plug $o$ is provided with automatic closing means comprising a coil spring 9 which is housed within a recess in the under side of the central enlarged portion $m$ of the handle $l$. One end of the coil spring is fixed to the casing of the gas tap, and the other end to a toothed disc 10 which engages one or more teeth 11 on the plug $o$, the arrangement operating in a similar manner to that described in specification No. 234,498 so as to enable the gas tap to be turned into the fully closed position even when the toothed disc is held in the open position by means of the thermostat controlled by the pilot flame. The toothed disc is provided with a catch 12 which is engaged by a co-operating member 13 connected to the thermostat 14. A projection $n$ is provided on the handle $l$ for engaging an igniting device for the pilot burner.

The gas tap is provided with two superposed peripheral grooves $r$, $v$, the lower one $r$ communicating with the opening $p$ through a groove $q$ and with a hole $s$, which is in communication with a bore $t$ provided in the arm $c$. The upper groove $v$ communicates with the bore $t$ through a hole $u$ and through a conduit $w$ with the inlet $x$ to the pilot burner $x^1$. By this means communication is established between the opening $p$ and the pilot burner $x^1$. The supply of gas between the holes $s$ and $r$ is controlled by means of a conical valve $z$ (Fig. 3) which seats on the inner end of a hollow plug $y$ which is screwed into the bore $t$ and is pressed into contact with the said end by means of a spring 1. The valve $z$ is provided with a stem 4 which projects outwardly from the plug and is engaged by a lever arm 5 (Fig. 1) provided on a short shaft housed within a bearing 6 which is secured to the boss $b$ of the water tab, the other end of the said shaft having a lever arm 7 fixed to it which bears against the stem of a diaphragm housed within a casing 8 which is screwed onto the water tap. The inner side of the diaphragm communicates with the interior of the water tap so that when the tap is under the pressure of the water the stem of the diaphragm will be pushed out, thereby pushing in the stem 4 of the valve $z$. By this means the hole $s$ is put into communication with the interior of the hollow plug $y$ which is provided with one or more radial openings 3 which communicate with the circumferential groove in the plug, whereby communication is established between the hole $r$ and the interior of the plug and thereby with the hole $s$. Thus when the water tap is under pressure, gas will be permitted to flow to the pilot burner but on the water supply failing, the stem of the diaphragm will be retracted by the action of the spring 1, assisted, if necessary, by an additional spring action on the lever arm 5 or on the diaphragm.

In th econstruction shown, the pilot burner $x'$ is on the opposite side of the tap to the bore $t$. In some cases it may be convenient to fit the burner $x'$ on the same side as the bore $t$ and in such cases the groove $v$ is dispensed with and the hole $u$ leads directly to the burner $x'$. It is not necessary for the thermostat to be heated by the pilot burner for lighting the main burner or burners since it is obvious that the same result can be obtained by the use of any flame the gas supply to which is controlled, independently of the supply to the main burner, in dependence on the water supply. When a pilot burner is fitted, however, it is advantageous to employ this burner for controlling the thermostat, since by this means the provision of a separate heating flame for the thermostat is avoided.

The feature of constructing the gas tap in such a manner that it allows a full supply of gas to be admitted to the burner or burners before the water tap is turned into the full open position and continues to admit the full gas supply until the water tap is turned into the full open position is in itself valuable and it is to be understood that this feature constitutes another aspect of the invention, alone or in combination with the control means for the gas supply to the pilot jet in dependence on the water supply.

It is to be understood that the invention is not limited to the details for carrying it out and that modifications may be effected without departing from the invention.

I claim:

1. In a water heater, the combination of a water conduit, a water tap for controlling the flow of water through said conduit, a main gas burner, an auxiliary gas burner, a gas tap for controlling the supply of gas to said main burner and having a separate conduit for supplying gas to the auxiliary burner, an actuating handle connected to one of said taps, coupling means for operatively connecting the gas and water taps to one another, automatic closing means for the gas tap arranged to urge the tap into the closed position, a thermostat device located in the heating zone of the auxiliary burner, locking means under the control of said thermostat device for maintaining the gas tap in the open position, a valve for controlling the supply of gas to the auxiliary burner from the gas tap and actuating means for said valve including a member exposed to the force of the water in the water conduit and arranged to close said valve on the water conduit becoming empty.

2. In a water heater, the combination as set forth in claim 1, in which the auxiliary burner is arranged so as to direct a flame into the region of the main burner so as to be capable of lighting the main burner.

3. In a water heater, the combination of a water conduit, a water tap for controlling the flow of water through said conduit, a main gas burner, an auxiliary gas burner, a gas tap for controlling the supply of gas to said main burner and having a separate conduit for supplying gas to the auxiliary burner, an actuating handle connected to one of said taps, coupling means for operatively connecting the gas and water taps to one another, automatic closing means for the gas tap arranged to urge the tap into the closed position, a thermostat device located in the heating zone of the auxiliary burner, locking means under the control of said thermostat device for maintaining the gas tap in the open position, a valve for controlling the supply of gas to the auxiliary burner from the gas tap and actuating means for said valve including a casing in open communication with the water conduit, a piston in said casing arranged therein with one side exposed to the pressure of the water in the water conduit and a stem on the other side of the piston, said stem projecting through the casing to the outside and being displaceable so as to allow reciprocation of the piston, said stem being operatively connected to the valve so as to close the valve on the pressure in the water conduit failing.

4. In a water heater, the combination of a water conduit, a water tap for controlling the flow of water through said conduit, a main gas burner, an auxiliary gas burner, a gas tap for controlling the supply of gas to said main burner and having a separate conduit for supplying gas to the auxiliary burner, an actuating handle connected to one of said taps, coupling means for operatively connecting the gas and water taps to one another, automatic closing means for the gas tap arranged to urge the tap into the closed position, a thermostat device located in the heating zone of the auxiliary burner, locking means under the control of said thermostat device for maintaining the gas tap in the open position, a valve for controlling the supply of gas to the auxiliary burner from the gas tap and actuating means for said valve including a casing in open communication with the water conduit, a diaphragm housed in said casing and clamped around its edge therein with one side exposed to the pressure of the water in the water conduit and means connected to the diaphragm for operatively connecting it to the valve so as to close the valve on the pressure in the water conduit failing.

5. In a water heater, the combination of a water conduit, a water tap for controlling the flow of water through said conduit, a main gas burner, an auxiliary gas burner, a gas tap for controlling the supply of gas to said main burner and having a separate conduit for supplying gas to the auxiliary burner, an actuating handle connected to one of said taps, coupling means for operatively connecting the gas and water taps to one another, automatic closing means for the gas tap arranged to urge the tap into the closed position, a thermostat device located in the heating zone of the auxiliary burner, locking means under the control of said thermostat device for maintaining the gas tap in the open position, a valve for controlling the supply of gas to the auxiliary burner from the gas tap and actuating means for said valve including a member located on the downstream side of the water tap so as to be exposed to the force of the water in the water conduit and arranged to close said valve on the water conduit becoming empty.

6. In a water heater, the combination of a water conduit, a water tap for controlling the flow of water through said conduit, a main gas burner, an auxiliary gas burner, a gas tap for controlling the supply of gas to said main burner and having a separate conduit for supplying gas to the auxiliary burner, an actuating handle connected to one of said taps, coupling means for operatively connecting the gas and water taps to one another, said gas tap having a control opening therein for the gas supply to the main gas burner with a cross section sufficiently large to permit the full gas supply to be admitted when the water tap is in the partly open position, automatic closing means for the gas tap arranged to urge the tap into the closed position, a thermostat device located in the heating zone of the auxiliary burner, locking means under the control of said thermostat device for maintaining the gas tap in the open position, a valve for controlling the supply of gas to the auxiliary burner from the gas tap and actuating means for said valve including a member exposed to the force of the water in the water conduit and arranged to close said valve on the water conduit becoming empty.

7. In a water heater, the combination of a water conduit, a water tap for controlling the flow of water through said conduit, a main gas burner, an auxiliary gas burner, a gas tap for controlling the supply of gas to said main burner, said gas tap having a control opening therein for the gas supply to the main burner, and a peripheral groove in open communication with said control opening, a conduit in communication with said peripheral groove for supplying gas to the auxiliary burner, an actuating handle connected to one of said taps, coupling means for operatively connecting the gas and water taps to one another, automatic closing means for the gas tap arranged to urge the tap into the closed position, a thermostat device located in the heating zone of the auxiliary burner, locking means under the control of said thermostat device for maintaining the gas tap in the open position, a valve for controlling the supply of gas to the auxiliary burner from the conduit communicating with the peripheral groove in the gas tap and actuating means for said valve including a member exposed to the force of the water in the water conduit and arranged to close said valve on the water conduit becoming empty.

8. In a water heater, the combination of a water conduit, a water tap for controlling the flow of water through said conduit, a main gas burner, an auxiliary gas burner, a gas tap comprising a tap body with a plug member therein having a control opening for controlling the supply of gas to the main burner and a peripheral groove therein in open communication with said control opening and the tap body having a bore therein in open communication with said groove for supplying gas to the auxiliary burner, a hollow plug in said bore, a conical valve arranged in said bore so as to seat on the inner end of said hollow plug and having a stem which projects through the outer end of the hollow plug to the outside, a spring in said bore arranged to urge said valve on to its seat, an actuating handle connected to one of said taps, coupling means for operatively connecting the gas and water taps to one another, automatic closing means for the gas tap arranged to urge the tap into the closed position, a thermostat device located in the heating zone of the auxiliary burner, locking means under the control of said thermostat device for maintaining the gas tap in the open position, and actuating means for said valve including a member exposed to the force of the water in the water conduit and a member arranged to bear against the valve stem so as to force the valve off its seat against the action of the spring which forces the valve on to its seat to shut off the gas supply to the auxiliary burner on the water conduit becoming empty.

9. In a water heater, the combination of a water conduit, a water tap for controlling the flow of water through said conduit, a main gas burner, an auxiliary gas burner, a gas tap comprising a tap body with a plug member therein having a control opening for controlling the supply of gas to the main burner and a peripheral groove therein in open communication with said control opening and the tap body having a bore therein in open communication with said groove for supplying gas to the auxiliary burner, a hollow plug in said bore, a conical valve arranged in said bore so as to seat on the inner end of said hollow plug and having a stem which projects through the outer end of the hollow plug to the outside, a spring in said bore arranged to urge said valve on to its seat, an actuating handle connected to one of said taps, coupling means for operatively connecting the gas and water taps to one another, automatic closing means for the gas tap arranged to urge the tap into the closed position, a thermostat device located in the heating zone of the auxiliary burner, locking means under the control of said thermostat device for maintaining the gas tap in the open position, a casing in open communication with the water conduit, a diaphragm housed in said casing and clamped around its edge therein with one side exposed to the pressure of the water in the water conduit, said diaphragm having a stem extending outside said casing and a lever pivoted on the water tap and having one arm in operative relationship with the stem of the conical valve and the other arm in operative relationship with the stem of the diaphragm, so as to enable the diaphragm to maintain the valve raised from its seat while the water conduit is full of water.

10. In a water heater, the combination of a water conduit, a water tap for controlling the flow of water through said conduit, a main gas burner, an auxiliary gas burner, a gas tap comprising a tap body with a plug member therein having a control opening for controlling the supply of gas to the main burner and a peripheral groove therein in open communication with said control opening and the tap body having a bore therein on the side of the plug member remote from the auxiliary burner and in open communication with said groove in the plug member, a hollow plug in said bore, a conical valve arranged in said bore so as to seat on the inner end of said hollow plug and having a stem which projects through the outer end of said hollow plug to the outside, a spring in said bore arranged to urge said valve on to its seat, said hollow plug having a peripheral groove and radial bores therein for connecting the peripheral groove to the interior of the hollow plug and a conduit connected to said peripheral groove in the hollow plug and in open communication with the auxiliary gas burner, an actuating handle connected to one of said taps, coupling means for operatively connecting the gas and water taps to one another, automatic closing means for the gas tap arranged to urge the tap into the closed position, a thermostat device located in the heating zone of the auxiliary burner, locking means under the control of said thermostat device for maintaining the gas tap in the open position, and actuating means for said valve including a member exposed to the force of the water in the water conduit and a member arranged to bear against the valve stem so as to force the valve off its seat against the action of the spring which forces the valve on to its seat to shut off the gas supply to the auxiliary burner on the water conduit becoming empty.

11. In a water heater, the combination of a water conduit, a water tap for controlling the flow of water through said conduit, a main gas burner, an auxiliary gas burner, a gas tap comprising a tap body with a plug member therein having a control opening for controlling the supply of gas to the main burner and a peripheral groove therein in open communication with said control opening and the tap body having a bore therein on the side of the plug member remote from the auxiliary burner and in open communication with said groove in the plug member, a hollow plug in said bore, a conical valve arranged in said bore so as to seat on the inner end of said hollow plug and having a stem which projects through the outer end of said hollow plug to the outside, a spring in said bore arranged to urge said valve on to its seat, said hollow plug having a peripheral groove and radial bores therein for connecting the peripheral groove to the interior of the hollow plug, the plug member of the gas tap having a second peripheral groove therein, a conduit connected to the peripheral groove in the hollow plug and said second peripheral groove in plug member of the gas tap and a conduit connecting the auxiliary burner to the second peripheral groove in the plug member of the gas tap, an actuating handle connected to one of said taps, coupling means for operatively connecting the gas and water taps to one another, automatic closing means for the gas tap arranged to urge the tap into the closed position, a thermostat device located in the heating zone of the auxiliary burner, locking means under the control of said thermostat device for maintaining the gas tap in the open position, and actuating means for said valve including a member exposed to the force of the water in the water conduit and a member arranged to bear against the valve stem so as to force the valve off its seat against the action of the spring which forces the valve on to its seat to shut off the gas supply to the auxiliary burner on the water conduit becoming empty.

MECHEL RABINOWICZ.